Jan. 11, 1955

A. C. RADTKE 2,698,965

APPLICATOR FOR APPLYING A PLASTICS COATING
TO GLASS OR OTHER FILAMENTS

Filed April 22, 1953

INVENTOR
ADELBERT C. RADTKE, DECEASED
BY LILLIAN E. RADTKE, ADMINISTRATRIX

Paul O. Pippel

ATT'Y

INVENTOR
ADELBERT C. RADTKE, DECEASED
BY LILLIAN E. RADTKE, ADMINISTRATRIX
ATT'Y

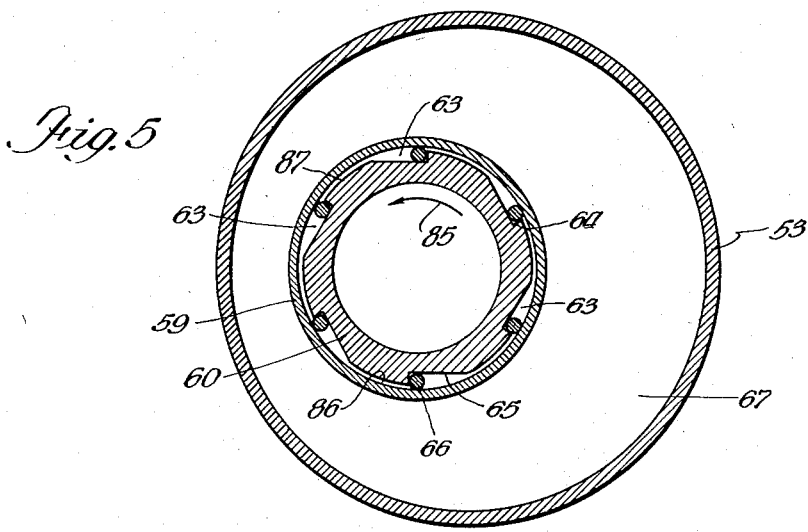
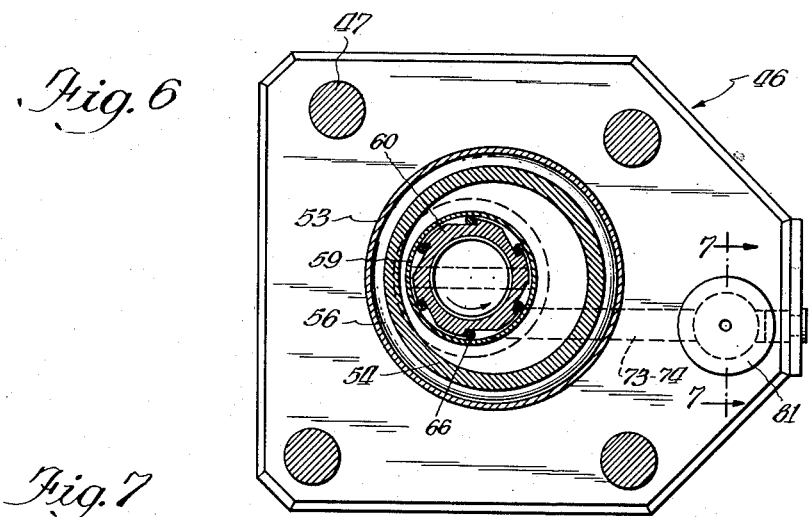
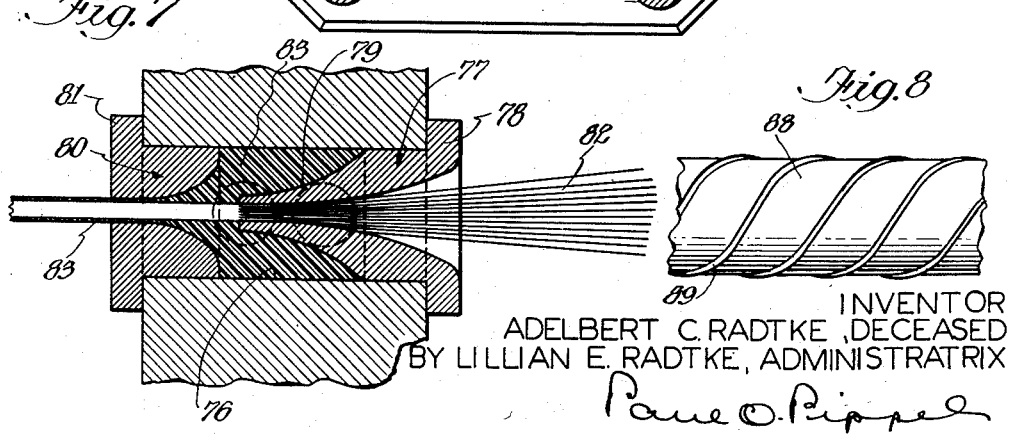
INVENTOR
ADELBERT C. RADTKE, DECEASED
BY LILLIAN E. RADTKE, ADMINISTRATRIX
ATT'Y

United States Patent Office 2,698,965
Patented Jan. 11, 1955

2,698,965

APPLICATOR FOR APPLYING A PLASTICS COATING TO GLASS OR OTHER FILAMENTS

Adelbert C. Radtke, deceased, late of Oak Park, Ill., by Lillian E. Radtke, administratrix, Oak Park, Ill., assignor to International Harvester Company, a corporation of New Jersey Application April 22, 1953, Serial No. 350,352

3 Claims. (Cl. 18—13)

This invention relates to a new and improved applicator for applying a plastics coating to glass or other filaments.

A principal object of this invention is to provide an applicator for applying a coating to thread-like filaments and wherein the coating is a plastics requiring time and heat for proper curing.

Another important object of this invention is the provision of means in a plastics applicator for pumping the plastics through an elongated tubular opening and simultaneously positively wiping the outer circumferential wall of the elongated passage.

Another and still further important object of this invention is to supply a plastics coating applicator for filaments or the like wherein the plastics is forced through an elongated heating and curing chamber.

A still further important object of this invention is to provide a combination fluid pump, elongated heating and curing passage, and a sleeve delivery die wherein a heat and time curing plastics may be applied directly to and over glass or other filaments in a sleeve form.

Another and still further important object of this invention is to provide a continuously operating plastics coating machine wherein the pump and heating chamber have means for constantly agitating the plastics and simultaneously constantly scraping the walls thereof, thus contributing to long and successful operation.

Other and further important objects will become apparent from the disclosures in the following specification and accompanying drawings.

In the drawings:

Fig. 5 is an enlarged sectional view taken on the line 5—5 of Fig. 2.

Fig. 6 is a sectional view taken on the line 6—6 of Fig. 2.

Fig. 7 is a sectional view taken on the line 7—7 of Fig. 6.

Fig. 8 is a partial plan view detail of a modified form of rotor usable in the applicator of this invention.

As shown in the drawings:

Figure 1:
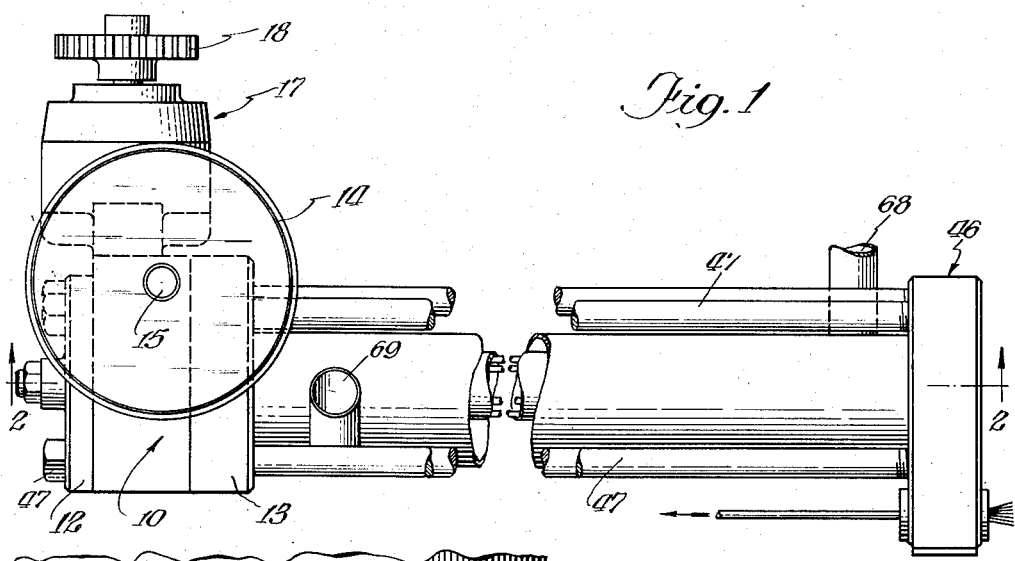
Fig. 1 is a top plan view of the applicator of this invention.

The reference numeral 10 indicates generally a housing for a fluid motor 11. A cover plate 12 is provided at one end of the housing and an inner enclosure plate or block 13 completes the housing 10 and the full enclosure of the fluid motor 11. An open top container 14 carries a supply of fluid plastic material. The plastic material is of the thermo-plastic type and is preferably uncured and in a cold state. The container 14 is provided with a bottom discharge opening 15. A passage 16 in the housing 10 is adapted to receive the contents of the container 14.

A fluid pump 17 of standard construction is adapted to be driven by a sprocket 18. An inlet port 19 directly receives fluid plastics from the passage 16 in the housing 10 on the suction side of the pump 17. The fluid plastics is thereafter passed through the pump 17 and is delivered to a discharge port 20 under pressure.

The fluid motor comprises a circular rotor 21 which is disposed within the center of an oval-shaped opening in the housing 10. The central positioning of a circular rotor in an oval-shaped opening defines a crescent or moon-shaped space 23 between the upper half of the rotor 21 and the top of the oval opening 22 and similarly a crescent-shaped space 24 between the lower half of the rotor 21 and the bottom of the oval opening 22. The rotor 21 is provided with diametrically opposed vanes 25 and 26. Another pair of diametrically opposed vanes 27 and 28 are positioned in the rotor 21 at right angles to the vanes 25 and 26. The vanes rotate with the rotor 21 and ride on the inner periphery of the oval-shaped opening 22.

An inlet passage 29 in the housing 10 joins the discharge port 20 of the pump 17 and is adapted to feed fluid plastics under pressure directly to the crescent-shaped opening 24. A circular-shaped passage 30 joins the passage 29 and is adapted to by-pass preferably one-half of the incoming fluid plastics from the passage 29 for delivery to the crescent-shaped space 23. There is thus provided a divided passage for delivery of one-half of the incoming plastics to each half of the fluid motor. It is therefore apparent that the rotor 21 of the fluid motor 11 is balanced at all times about a central axis. In other words, it is a double fluid motor constantly being driven by fluid-under-pressure from diametrically opposed positions.

Figure 2:
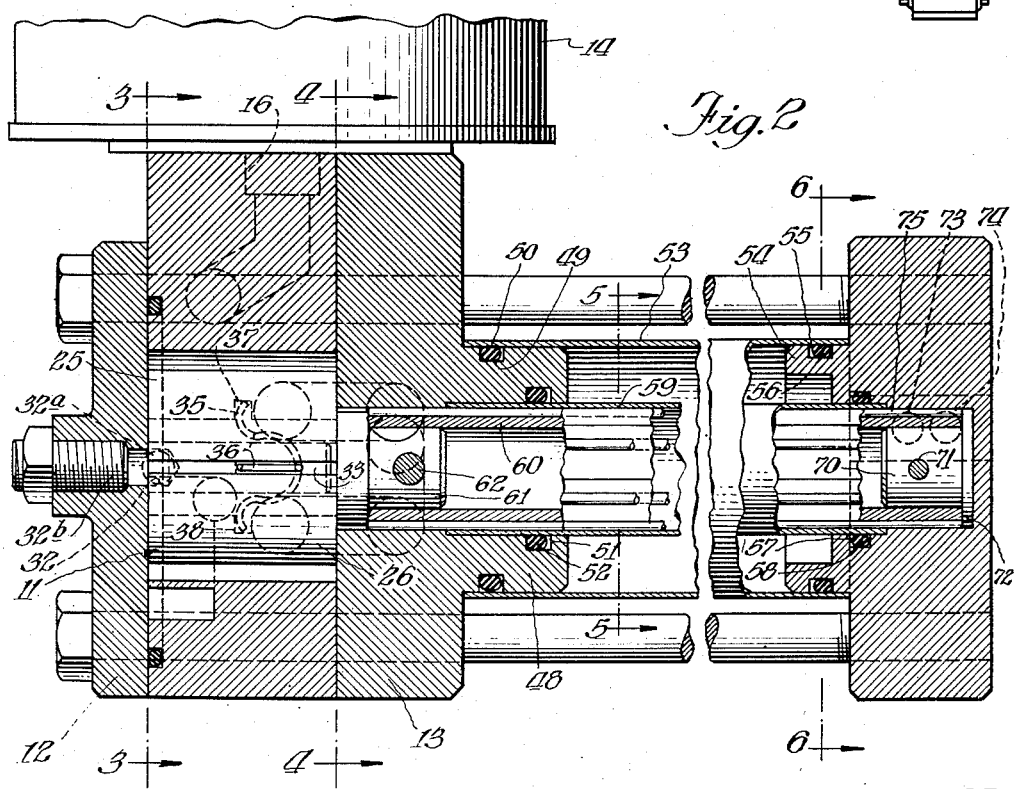
Fig. 2 is a longitudinal sectional view taken on the line 2—2 of Fig. 1.
Figure 3:
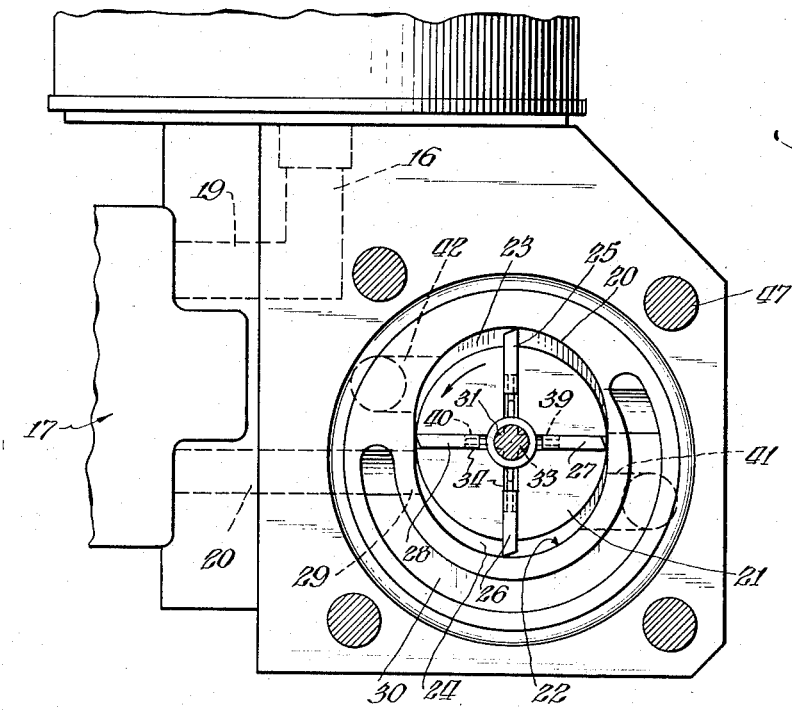
Fig. 3 is a sectional view taken on the line 3—3 of Fig. 2.
Figure 4:
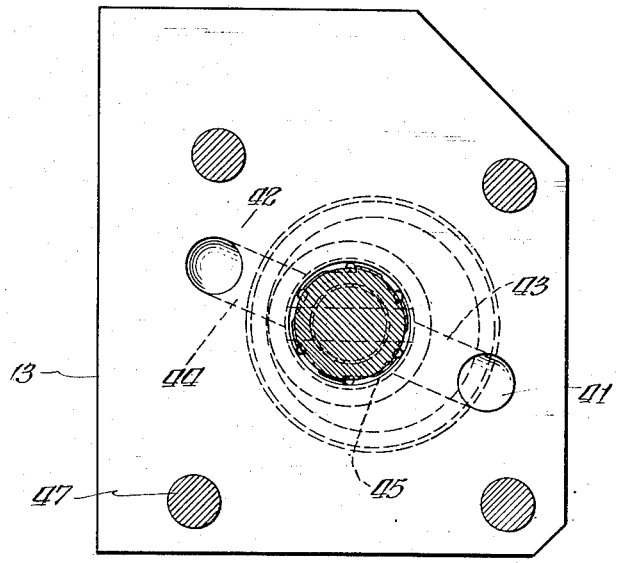
Fig. 4 is a sectional view taken on the line 4—4 of Fig. 2.

The rotor 21 is provided with a central shaft 31. A drilled end 32 of the shaft 31 receives a bearing guide pin 32a which is threaded as shown at 32b, within the housing cover plate 12. The pin 32a provides for the proper journalling of the rotor. A cross-shaped slot 33 is provided throughout a major portion of the shaft 31 opposite the journalling end 32. A cross slot 34 in the rotor 21 is adapted to be positioned around and over the cross slot 33 in the shaft 31. The cross slot 34 constitutes a radially outward continuation of the cross slot 33. The slots receive the vanes 25, 26, 27, and 28. Compression spring members 35 and 36 are positioned at right angles to one another and are the means for causing the spring extension of the vanes 25 to 28 inclusive. A notch 37 is provided in the center lower edge of the under side of the vane 25. Similarly, notches 38, 39, and 40 are provided in the center and lower edges of the under side of the vanes 26, 27, and 28 respectively. The spring member 35 is journalled at its center portion through the shaft 31 and is adapted to engage the notch 37 at one end and the notch 38 at its other end so that the single spring 35 acts to extend the diametrically opposed vanes 25 and 26 radially outwardly from the rotor 21 so that the walls of the oval-shaped opening 22 are constantly wiped clean. Similarly, the spring 36 of slightly less depth than the spring 35 nests within and at right angles to the spring 35 and engages the notches 39 and 40 to cause a radial extension of the diametrically opposed vanes 27 and 28. This is best shown in Figs. 2 and 3.

A discharge port 41 for the crescent-shaped space 24 is adapted to receive fluid delivered by the fluid motor 11, and a discharge port for the crescent-shaped space 23 is provided for the discharge of fluid plastics from the opposing half of the fluid motor. Diagonally disposed aligned passages 43 and 44 join the discharge ports 41 and 42 respectively with a heat curing passage 45.

A spaced apart end housing 46 lies parallel with the housing 10 and, by reason of elongated bolts 47, holds the entire unit of housing 10, cover plate 12, inner enclosure plate 13, and end housing 46 in rigid relationship to each other. As best shown in Fig. 2, a cylindrical extension 48 of the inner block 13 of the housing 10 is provided with an annular groove in the outer periphery as shown at 49 for the purpose of receiving a rubber O ring 50. A second annular groove 51 is provided in the inner surface of the cylindrical extension 48 and carries a rubber O ring 52. An outer sleeve 53 is adapted to have a tight sliding fit over the outer annular extension 48. The O ring 50 effects a tight seal between the outer sleeve 53 and the cylindrical extension 48. A lateral cylindrical extension 54 of the end housing 46 projects in a direction toward the main housing 10. An annular groove 55 is provided in the outer surface of the cylindrical extension 54 and carries a rubber O ring 56 in the same manner as the extension 48 carries the O ring 50 in the annular groove 49. The outer sleeve is thus positioned over the cylindrical extension 54 in sealed-tight relationship therewith by reason of the rubber O ring 56. An annular groove 57 is provided in the inner surface of the cylindrical extension 54 and similarly carries a rubber O ring 58. A sleeve 59 is disposed within the outer sleeve 53 and is in sealing engagement at its end thereof by the O rings 52 and 58.

An inner sleeve 60 engages a lateral extension 61 of the fluid motor rotor 21 by means of a pin 62. It thus should be apparent that as the motor rotor 21 rotates, the inner sleeve 60 will similarly be rotated. The annular space defined by the sleeve 59 and the inner sleeve 60 has been previously designated as the heat curing passage 45. A plurality of notches 63 extend longitudinally along the external surface of the inner sleeve 60 at spaced intervals therearound. The notches 63 are provided with vertical walls 64 and inclined walls 65. Elongated rods 66 are disposed in said notches and are caused to ride against the vertical walls 64 as the inner sleeve 60 is rotated by the rotor 21. The rods are of a diameter substantially equal to the depth of the heat curing passage when the rods are disposed within the notches 63. This means that as the sleeve 60 rotates the elongated rods 66 constantly wipe the inner annular surface of the sleeve 59.

A heat exchange chamber 67 is defined as that space between the sleeve 59 and the outer sleeve 53. An inlet 68 is provided for the chamber 67 and similarly an outlet is provided at 69. Any suitable heat exchange medium may be delivered through the inlet 68 and upon passing through the chamber 67 imparts its heat to the fluid plastics as it is forced through the elongated heat curing passage 45 by reason of the combined pump and motor. Thus as the cold uncured fluid plastics passes through the passage 45, the plastics is cured progressively until as the plastics reaches the spaced apart end housing 46 it is cured and in proper condition for application as an outer coating for a strand or the like. As shown, the heat exchange chamber 67 has been designed for a fluid heating medium, but it should be understood that any type of heat means may be applied to the heat curing passage 45 to effect a curing of the plastics as it is pumped through the narrow elongated annular chamber.

A plug 70 is provided for the end of the inner sleeve 60 disposed within the spaced apart end housing 46. A pin 71 joins the plug 70 with the inner sleeve, and thus as the sleeve is rotated by the fluid motor rotor the plug similarly rotates. An enlarged annular flange 72 is provided on the end of the plug 70 to constitute an end abutting member for the elongated rods 66. Closely adjacent passages 73 and 74 are provided in the end housing 46 adjacent the discharge end 75 of the heat curing chamber passage 45 and extend in side-by-side relation to the coating chamber 76. The coating chamber 76 constitutes a transverse passage within the end housing 46 offset from axial alignment with the heat curing passage 45. Plastics cured by reason of its passage through the elongated chamber 45 is thereupon delivered through the passages 73 and 74 to the coating chamber 76. A filament gatherer 77 is disposed within the coating chamber 76 and is provided with an annular flange 78 for engaging the outer wall of the end housing 46. A tapered or cone-shaped portion 79 of the gatherer 77 permits an aggregation of cured fluid plastics therearound and within the coating chamber 76. A plastics stripping die 80 is disposed in the coating chamber 76 spaced from the filament gatherer and similarly is provided with an annular flange 81 to engage the opposite outer wall of the end housing 46.

In the operation of the device of this invention, a plurality of pre-coated individual glass filaments are drawn through the filament gatherer element 77 wherein they are compactly formed in a round strand formation and pass through the coating chamber 76. The coating chamber is filled with cured hot plastic material 83 which forms on and around the gathered glass filaments. As the glass filaments are drawn through the coating chamber and out the plastics stripping die 80, a thin uniform plastics jacket 84 has been formed about the glass strand. The stripping die 80 provides for an even thickness of the plastics jacket 84, and surplus plastics 83 remains within the coating chamber 76. In reviewing the entire operation of this applicator, cold uncured plastics is deposited within the open topped container 14, whereupon it falls by gravity through the bottom discharge opening 15 and thereupon is transmitted to the pump 17. When the plastics material leaves the pump, it is forced under pressure through the fluid motor 11. The fluid plastics under pressure constitutes the driving means for the fluid motor, and as the motor is driven, so also is the inner sleeve 60 with its wall wiping rods 66. As best shown in Fig. 5, the inner sleeve rotates in the direction of the arrow 85 causing the elongated rods 66 to maintain the inner surface 86 of the sleeve 59 clean. The elongated round rods 66 are free to rotate about their own axes and insure that the plastics during its heat curing treatment will be positively cleared from the heat curing passage 45. The elongated rods 66 do not perform the function of moving the fluid plastics longitudinally through the heat curing chamber 45. The plastics receives its moving force by reason of the fluid pump 17, and similarly the rotation of the inner sleeve 60 also receives its motive power by reason of the pump 17 through the medium of the fluid motor 11. The curing of plastics material, and particularly thermo-plastics material, creates difficult problems. During curing, the plastics material passes through various stages of viscosity and various degrees of stickiness. Just prior to complete curing of the plastics, there is usually a very sticky gummy stage which invariably causes most known applicators to fail, and it is with this in mind that the present device was developed. The entire unit performs the function of maintaining the plastics under constant agitated movement during curing and immediately thereafter provides for the depositing of the cured plastics onto a strand to be coated. The rolling rods 66, which are freely mounted for limited movement within the notches 63, act to simultaneously maintain the outer surface 87 of the inner sleeve 60 free of sticky plastics material and similarly maintain the inner surface 86 of the sleeve 59 free and clear of all plastics material. It will thus be apparent that there is required a minimum of cleaning in the applicator of this invention. However, in the event it is desired to discontinue coating operation, the entire unit may be taken apart and the inner sleeve 60 with its loosely mounted rods 66 withdrawn for cleaning purposes, if desired.

As best shown in Fig. 8, a modified form of inner sleeve is designated by the reference numeral 88 and rather than being provided with loosely mounted elongated rods is equipped with a spiral rib 89 integral with the outer surface of the sleeve 88. The rib 89 is of sufficient depth to form a snug fit within the sleeve 59, whereupon the spiral rib 89 performs the dual function of wiping the inner surface 86 of the sleeve 59 and simultaneously providing for some longitudinal moving force for the fluid plastics material during the time of curing within the heat passage 45. But for the additional longitudinal moving force, the sleeve 88 with its spiral rib 89 functions in the same manner as the inner sleeve 60.

Numerous details of construction may be varied throughout a wide range without departing from the principles disclosed herein, and it is not proposed to limit the patent granted hereon otherwise than as necessitated by the appended claims.

What is claimed is:

1. A plastics applicator comprising a fluid motor, an agitator member rotatably driven by said fluid motor, a tubular sleeve concentric with and spaced outwardly from said agitator member and defining a tubular space about the agitator member for passage of fluid plastics from said fluid motor, means on said agitator member projecting outwardly into the tubular space and adapted to agitate fluid plastics passing therethrough, heating means for said tubular passage, and die means for discharging heated fluid plastics, said means on the agitator member including said member having longitudinal notches in the outer periphery thereof, and rods in said longitudinal notches adapted to rotate with said agitator member and wipe the inner surface of said outer tubular concentric sleeve.

2. A plastics applicator apparatus comprising a container for fluid plastics, a fluid pump arranged and constructed to receive fluid plastics from said container and deliver it from said pump under pressure, a fluid motor adapted to receive fluid plastics under pressure, said fluid motor having a driven rotor, an elongated agitator element fastened to and driven by said rotor, an elongated sleeve concentric with said agitator element and defining a tubular passage between the agitator element and the sleeve through which fluid plastics may pass, means forming a heat chamber around said sleeve for heat treating the plastics within the tubular passage, a fluid plastics discharge housing, and strand gatherer and die means in said discharge housing whereby a strand gathered by said strand gatherer may be coated with the heat treated fluid plastics and pulled through the die means for effecting a uniform plastics coating on the gathered strand.

3. A device as set forth in claim 2 in which the means forming a heat chamber constitutes an outer sleeve, sealing means at the ends of said outer sleeve, and said outer sleeve having an inlet opening and an outlet opening for the passage of a heating medium.

References Cited in the file of this patent

UNITED STATES PATENTS

| Number | Name | Date |
|---|---|---|
| 342,562 | Begin | May 25, 1886 |
| 1,466,639 | Browne | Aug. 28, 1923 |
| 1,823,885 | Cherry | Sept. 22, 1931 |
| 1,933,528 | Wallace et al. | Oct. 31, 1933 |
| 1,934,647 | State et al. | Nov. 7, 1933 |
| 2,306,602 | Harrington | Dec. 29, 1942 |
| 2,632,398 | Ferris | Mar. 24, 1953 |
| 2,658,796 | Kopperschmidt | Nov. 10, 1953 |